June 7, 1949. H. K. ANSINGH 2,472,455
DUAL GRIP CONTRACTIBLE HOSE COUPLING
Filed Aug. 14, 1946

INVENTOR.
HERMAN K. ANSINGH
BY
William E. Chilton
ATT'Y

Patented June 7, 1949

2,472,455

UNITED STATES PATENT OFFICE 2,472,455

DUAL GRIP CONTRACTIBLE HOSE COUPLING

Herman Kimball Ansingh, Beaufort, N. C., assignor to Frank J. Raybould, Lakewood, Ohio Application August 14, 1946, Serial No. 690,355

3 Claims. (Cl. 285—86)

This invention relates to an attachable and detachable coupling device for connecting a flexible high pressure hose to a suitable connection and which is quickly and readily assembled and disassembled without the use of any special tools.

Reinforced hose or armored flexible tubing are used as conduits for conveying fluids and gases under considerable pressure. To facilitate the connection of such hoses with associated mechanism, couplings have heretofore been provided which are usually equipped at one end with adaptations which usually have male or female threads and which are well known and common to standard fittings for making continuous connections.

It is required that the coupling be leak-proof under both maximum and minimum pressures and should be secured to the hose in such a manner that the hose will not blow off under the high pressures or be weakened where the coupling is applied which may cause it to blow off or burst at a pressure below the normal rating burst pressure of the hose itself, so that the maximum capacity of the hose may be utilized.

One of the objects of the invention is to provide a coupling of the character described which may be readily assembled or disassembled in the field and without the aid of special tools.

Another object of the invention is to provide a hose coupling of the character described which has a minimum number of parts to be handled and which can be re-used and again assembled on the same or another hose. This coupling is particularly adapted for use with a hose for high pressure applications. Such a hose includes a metallic reinforcement which is covered both on the inside and the outside with a layer of fabric or the like and which is usually coated or impregnated with rubber or some similar composition. The manufacturers of hose of this type require comparatively wide tolerances for both inside and outside dimensions. The tolerances permitted run from $\frac{1}{32}$ of an inch for the inside diameter of the hose to $\frac{1}{16}$ of an inch for the outside diameter. These wide tolerances have been a great deterrent to the satisfactory functioning of many of the couplings now in use.

Another object of my invention is to provide a hose coupling which will compensate for these tolerances and at the same time provide a satisfactory connection which will withstand the pressures to which the coupling and hose are subjected.

A further object of the invention is to provide a hose coupling of the character described in which the hose is externally compressed and internally expanded and at the same time submitted to an endwise pressure when the two parts of the coupling are secured together.

Further and more limited objects of the invention will appear as the description proceeds and by reference to the accompanying drawings in which Fig. 1 is a vertical sectional view of my improved hose coupling applied to a section of hose;

Figure 6:
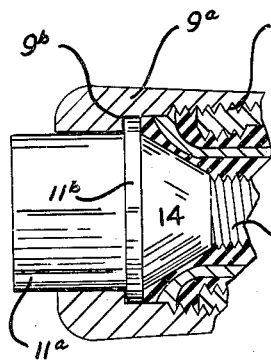
Fig. 6 is a sectional view showing a slightly modified form of metal insert.
Figure 1:
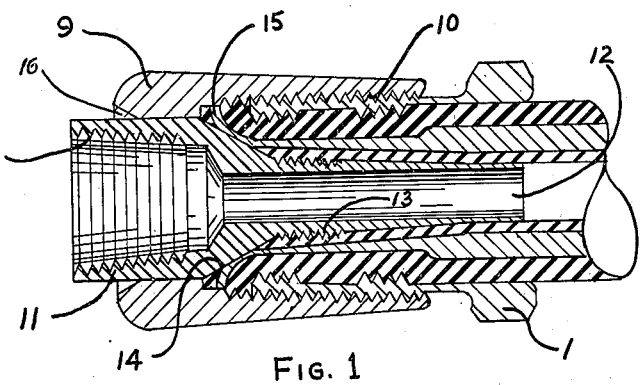
Figure 4:
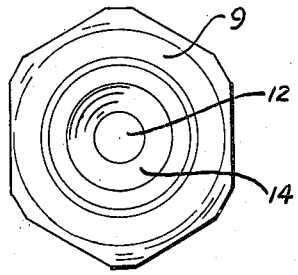
Fig. 4 is an end view of the nut shown in Fig. 2.
Figure 2:
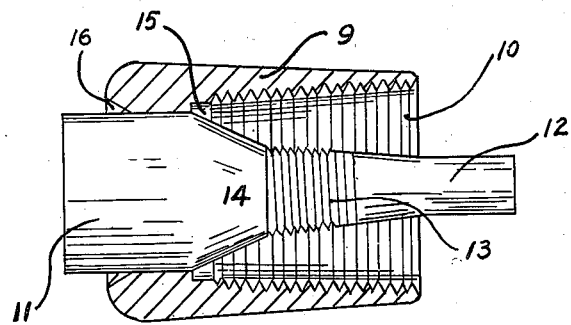
Fig. 2 is a vertical sectional view of the nut which has therein a metal insert.
Figure 5:
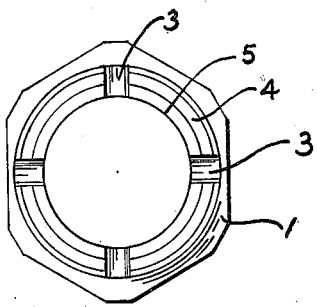
Fig. 5 is an end view of the collet bushing shown in Fig. 3.
Figure 3:
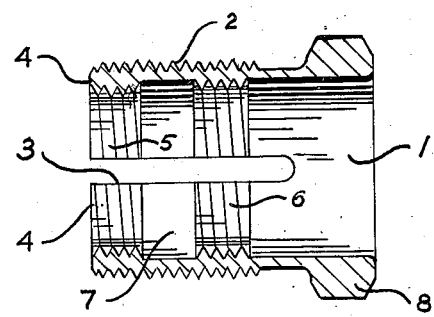
Fig. 3 is a vertical sectional view of the collet bushing.

Referring now to the drawings, my improved coupling comprises what I term a collet bushing 1 which is exteriorly threaded as indicated at 2. This bushing preferably has therein a plurality of sawed slots 3 which are equally spaced and which extend axially from the front end of the bushing and divide the bushing into a plurality of segments indicated by the reference character 4. The segments thus provided are resilient, the purpose of which will hereinafter appear.

The bushing 2 has a plurality of spaced interiorly threaded portions 5 and 6 between which is disposed an annular recess or depression 7. This bushing is preferably formed from hexagonal stock and its head portion 8 is preferably hexagonal in shape to facilitate turning thereof.

The reference character 9 designates a metal insert nut which is also preferably hexagonal in shape. The nut is interiorly threaded as indicated at 10. This threaded portion preferably is tapered outwardly at an angle of the order of about three degrees or thereabout. Permanently secured within the nut 9 is a metal insert 11 which has an axial tubular extension which tapers outwardly toward its outer end. This extension has provided thereon an exteriorly threaded portion 13. Immediately adjacent the threaded portion 13 the metal insert is tapered in the opposite direction as indicated by the reference character 14. This portion of the metal insert cooperates with the interior wall of the nut 9 to provide a chamber or recess 15 into which the end of the hose is confined.

In assembling the coupling, the collet bushing 1 is applied over the end of the hose with about $\frac{1}{4}$ inch of the hose projecting beyond the end thereof, the segments having been first bent outwardly to a slight extent. The nut 9 is then threaded over the projecting ends of the segments with the metal insert extension 12 extending into the interior of the hose. The metal insert 11 is rigidly and permanently secured to the nut 9, being welded or brazed or otherwise secured thereto as indicated at 16. As the nut 9 is threaded over the collet bushing 1, the metal segments 4 are moved radially inward and compressed against the exterior of the hose due to the slight taper of the threaded portion 10 of the nut 9. The hose is also expanded outwardly by means of the tapered extension 12. The interior threads 5 and 6 contained on the collet bushing grip or bite into the outer wall of the hose. The threaded portion 13 on the extension 12 likewise tends to bite into and grip the inner wall of the hose. In the final tightening of the insert nut into the collet bushing, the tapered portion 14 is forced against the end of the hose extending through the collet bushing and spreading or mushrooming the same into tight relationship with the walls of the recess 15 with the result that the end of the hose is subjected to an endwise pressure when the two parts of the coupling are screwed home. Due to the taper of the interiorly threaded portion 10 of the nut 9 and the arrangement of the segments 4, the two parts of the coupling will fit hoses varying in inside and outside diameter in excess of the tolerance limits hereinbefore mentioned. The threaded portion 13 on the metal insert has the same pitch as the interiorly threaded portion of the nut, thereby synchronizing the advance of the insert with the advance of the nut. This construction permits re-tightening of the coupling without disturbing the original seal after long operational periods and without damaging the hose. The end of the hose may have axial slits therein to facilitate mushrooming of the end of the hose when the coupling members are tightened.

The segments of the collet bushing are contracted against the wall of the hose in proportion to the mechanical pressure applied through the tapered thread of the insert nut. There is also an expansion or mushrooming of the end of the hose as a result of the angular section of the insert at the final tightening of the nut. This hose coupling is intended for use on hose without first stripping the casing down to the reinforcing wire. Tests have demonstrated that when this coupling is attached in the manner hereinbefore described, it will sustain the pressure up to and in excess of the rated maximum burst pressure of the hose and firmly and rigidly hold the hose in place.

The end portion of the metal insert has a tapered threaded portion 17 which is adapted to receive any suitable connection or fitting therein in a manner well known to those skilled in the art.

If desired, the portion 13 of the metal insert may have annular grooves thereon instead of the threads as shown. Likewise the collet bushing 1 may have thereon annular grooved portions instead of the threads 5 and 6.

In Fig. 6 there is disclosed a slightly modified form of my invention in which the metal insert 11 is replaced by a metal insert 11a which has thereon an annular flange 11b the periphery of which is preferably hexagonal in shape so as to receive thereover a spanner wrench, the purpose being to enable the insert to be screwed into the hose after the collet 1 is in position and to expand and mushroom the end of the hose against the tapered portion 14 of the insert. When the two parts of the coupling are finally screwed home, the end of the hose is mushroomed outwardly and a pressure is exerted endwise or axially thereof. This construction enables the metal insert to be first screwed into the interior of the hose before the nut 9a is positioned thereover. The nut 9a has thereon a shoulder 9b which abuts the flange 11b. In this modified form of the invention the insert is of course not permanently secured to the nut as is the case with the form of the invention illustrated in Figs. 1 to 5 inclusive. In other respects, this form of the invention functions and operates in the same manner as that shown in Figs. 1 to 5 inclusive.

It will now be clear that I have provided a hose coupling which will accomplish the objects of the invention as hereinbefore stated. The embodiments of the invention herein disclosed are therefore to be considered merely as illustrative and not in a limiting sense, as various changes may be made in the details of construction and arrangement of parts without departing from the spirit of the invention. The invention therefore is limited only in accordance with the scope of the appended claims.

Having thus described my invention, I claim:

1. A hose coupling comprising a slotted cylindrical collet bushing which is adapted to fit around a flexible hose with the end of the hose projecting a short distance beyond the end of the bushing, a straight screw thread formed on the outer wall of said bushing, a nut having a tapered thread on the interior thereof and adapted to be screwed onto said bushing, an insert permanently secured to said nut and movable therewith and comprising an elongated tapered portion and a conical cam section, said nut and said insert cooperating with each other to simultaneously expand the interior of the hose radially outwardly and to compress the exterior of the hose radially inwardly and to compact the end of the hose between the end of the bushing and the nut, as said nut is screwed onto said bushing.

2. A hose coupling comprising a slotted cylindrical collet bushing adapted to fit around a flexible hose adjacent an end thereof, a straight screw thread formed on the outer wall of said bushing, a nut having a tapered thread on the interior thereof, said nut being adapted to be screwed onto said bushing, an insert having an elongated tapered portion permanently secured to said nut and movable therewith and adapted to enter said hose as said nut is screwed onto said bushing, said nut and said insert cooperating with each other to simultaneously expand the interior of said hose radially outwardly and to compress the exterior of said hose radially inwardly as said nut is screwed onto said bushing.

3. A hose coupling comprising a slotted cylindrical collet bushing adapted to fit around a flexible hose adjacent an end thereof, a straight screw thread formed on the outer wall of said bushing, a nut having a tapered thread on the interior thereof, said nut being adapted to be screwed onto said bushing, an insert having an elongated tapered portion permanently secured to said nut and movable therewith and adapted to enter said hose as said nut is screwed onto said bushing, a part of said elongated tapered portion having threads thereon of the same pitch as the threads on said collet bushing and said nut, said nut and said insert cooperating with each other to simultaneously expand the interior of said hose radially outwardly and to compress the exterior of said hose radially inwardly as said nut is screwed onto said bushing.

HERMAN KIMBALL ANSINGH.

REFERENCES CITED

The following references are of record in the file of this patent:

UNITED STATES PATENTS

| Number | Name | Date |
| --- | --- | --- |
| 1,234,812 | Simmonds | July 31, 1917 |
| 1,370,289 | Crippen | Mar. 1, 1921 |
| 2,091,085 | Scholtes | Aug. 24, 1937 |
| 2,179,200 | Scholtes | Nov. 7, 1939 |
| 2,388,992 | Pape et al. | Nov. 13, 1945 |